United States Patent
Toh et al.

(10) Patent No.: US 9,575,553 B2
(45) Date of Patent: Feb. 21, 2017

(54) REPLICA PATH TIMING ADJUSTMENT AND NORMALIZATION FOR ADAPTIVE VOLTAGE AND FREQUENCY SCALING

(71) Applicant: Advanced Micro Devices, Inc., Sunnyvale, CA (US)

(72) Inventors: Seng Oon Toh, Cambridge (GB); Edward J. McLellan, Holliston, MA (US); Stephen V. Kosonocky, Fort Collins, CO (US); Michael Leonard Golden, Mountain View, CA (US); Samuel D. Naffziger, Fort Collins, CO (US)

(73) Assignee: Advanced Micro Devices, Inc., Sunnyvale, CA (US)

(\*) Notice: Subject to any disclaimer, the term of this patent is extended or adjusted under 35 U.S.C. 154(b) by 129 days.

(21) Appl. No.: 14/576,924

(22) Filed: Dec. 19, 2014

(65) Prior Publication Data
US 2016/0179186 A1 Jun. 23, 2016

(51) Int. Cl.
*G06F 1/32* (2006.01)

(52) U.S. Cl.
CPC ............. *G06F 1/3296* (2013.01); *G06F 1/324* (2013.01); *G06F 1/3206* (2013.01)

(58) Field of Classification Search
CPC ................ G06F 1/04; G06F 1/08; G06F 1/26; G06F 1/3206
USPC .................................................. 713/322, 600
See application file for complete search history.

(56) References Cited

U.S. PATENT DOCUMENTS

| | | | |
|---|---|---|---|
| 6,963,992 B1* | 11/2005 | Cheng ....................... | G06F 1/08 713/300 |
| 9,021,324 B2* | 4/2015 | Chawla ............... | G06F 11/3024 714/731 |
| 2005/0283630 A1* | 12/2005 | Shikata ................. | G06F 1/3203 713/322 |
| 2010/0182055 A1* | 7/2010 | Rozen ....................... | G06F 1/04 327/155 |

OTHER PUBLICATIONS

U.S. Appl. No. 14/190,803, filed Feb. 26, 2014, entitled "Adaptive Voltage Scaling".

\* cited by examiner

*Primary Examiner* — Chun Cao (57) ABSTRACT

A processor employs a set of replica paths at a processor to determine an operating frequency and voltage for the processor. The replica paths each represent one or more circuit paths at a functional module of the processor. The delays at the replica paths are normalized to increase the likelihood that the replica paths accurately represent the behavior of the circuit paths of the functional module. After normalization, a distribution of delay values is generated by varying, at each replica path, the delay at an output node of the replica path until a mismatch is detected between a signal at the output node of the replica path and the delayed representation of the signal. The resulting distribution of delay values can then be adjusted based on variations in reference voltages at the replica paths to account for potential distribution errors resulting from the reference voltage variations.

20 Claims, 5 Drawing Sheets

REPLICA PATH TIMING ADJUSTMENT AND NORMALIZATION FOR ADAPTIVE VOLTAGE AND FREQUENCY SCALING

BACKGROUND

Field of the Disclosure

The present disclosure relates generally to processors and more particularly to adaptive voltage and frequency scaling for processors.

Description of the Related Art

The operational speed of a processor is limited by the propagation delay along circuit paths between input and output nodes of the processor. The period of a clock signal used to synchronize processor operations must be long enough to allow input signals to propagate along the circuit paths so that corresponding output nodes reach their responsive states before the end of each clock cycle. If the delay introduced by a circuit path is too long, an input signal may not produce the correct output state at the corresponding output node. Accordingly, the maximum clock frequency to ensure correct operation of the processor at a specified supply voltage is typically governed by the circuit paths having the largest delays. Such circuit paths are sometimes referred to as critical paths. Conventionally, the maximum clock frequency and corresponding supply voltage for the processor are determined by applying test patterns to the circuit paths of one or more test chips at varying clock frequencies and comparing resulting signals at the output nodes to expected signals. However, because of the large number of circuit paths in modern processors, such testing can be expensive and time consuming. In addition, to ensure proper operation of the largest number of processors, the maximum clock frequency and supply voltage are typically set to the "worst-case" values established during testing. Because of variations in process and operating conditions, the critical paths of the test chips may vary from the critical paths of a given processor, and the worst-case values may be too conservative for that processor, unnecessarily limiting processor performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques for employing a set of replica paths at a processor to determine an operating frequency and voltage for the processor. The replica paths each represent one or more circuit paths at a functional module of the processor. The delays at the replica paths are normalized to increase the likelihood that the replica paths accurately represent the behavior of the circuit paths of the functional module. After normalization, a distribution of delay values is generated by varying, at each replica path, the delay at an output node of the replica path until a mismatch is detected between a signal at the output node of the replica path and the delayed representation of the signal. The resulting distribution of delay values can then be adjusted based on variations in reference voltages at the replica paths to account for potential distribution errors resulting from the reference voltage variations. The adjusted distribution of delay values provides a statistical representation of the timing margins at the circuit paths of the functional module at a consistent reference voltage. Accordingly, the adjusted distribution of delay values can be used to adjust one or both of an operating frequency and a supply voltage of the functional module.

Each of the replica paths is of a known design. Accordingly, in many instances it is more efficient to establish the timing margins for the circuit paths of the functional module by testing the replica paths than by testing the circuit paths directly. However, process and operating condition variations can cause the behavior of the replica paths to differ from that of the functional module's circuit paths. By normalizing the delays at the replica paths and by adjusting the resulting distribution of delay values based on changes in the replica paths' supply voltages, the accuracy of the distribution, relative to the behavior of the circuit paths, is improved. Further, because the replica paths are located at the processor with the circuit paths of the functional module, adjustments to the operating frequency and supply voltage are made based on the process and operating conditions of the processor. The resulting operating frequency and supply voltage are therefore based on the process and operating conditions of the individual processor, rather than being solely based on testing of a set of test chips under conditions that may vary substantially from the operating conditions of the processor.

In some embodiments, the distribution of delay values can be masked to further improve accuracy of the distribution. For example, circuit paths can be primarily composed of long wire traces (referred to as "wire-dominated" paths) or of gates connected by short wire traces (referred to as "gate-dominated" paths). For certain processor designs or processor operating conditions, the timing margins of the functional modules of the processor may be more influenced by one type of path than another. In such scenarios, the delay values for replica paths corresponding to one of the path types can be masked from the distribution of delay values to ensure that the distribution more accurately represents the timing margins of the processor. For example, in a scenario where it is known that gate-dominated paths of the processor are more likely to establish the timing margins for the processor, the delay values for one or more wire-dominated replica paths can be masked from the distribution of delay values, thereby improving the accuracy of the distribution. In some embodiments the distribution of delay values can be masked based on other criteria, such as configuration of a given functional module of the processor, or based on whether a particular replica path is difficult to normalize with the other replica paths.

Figure 1:
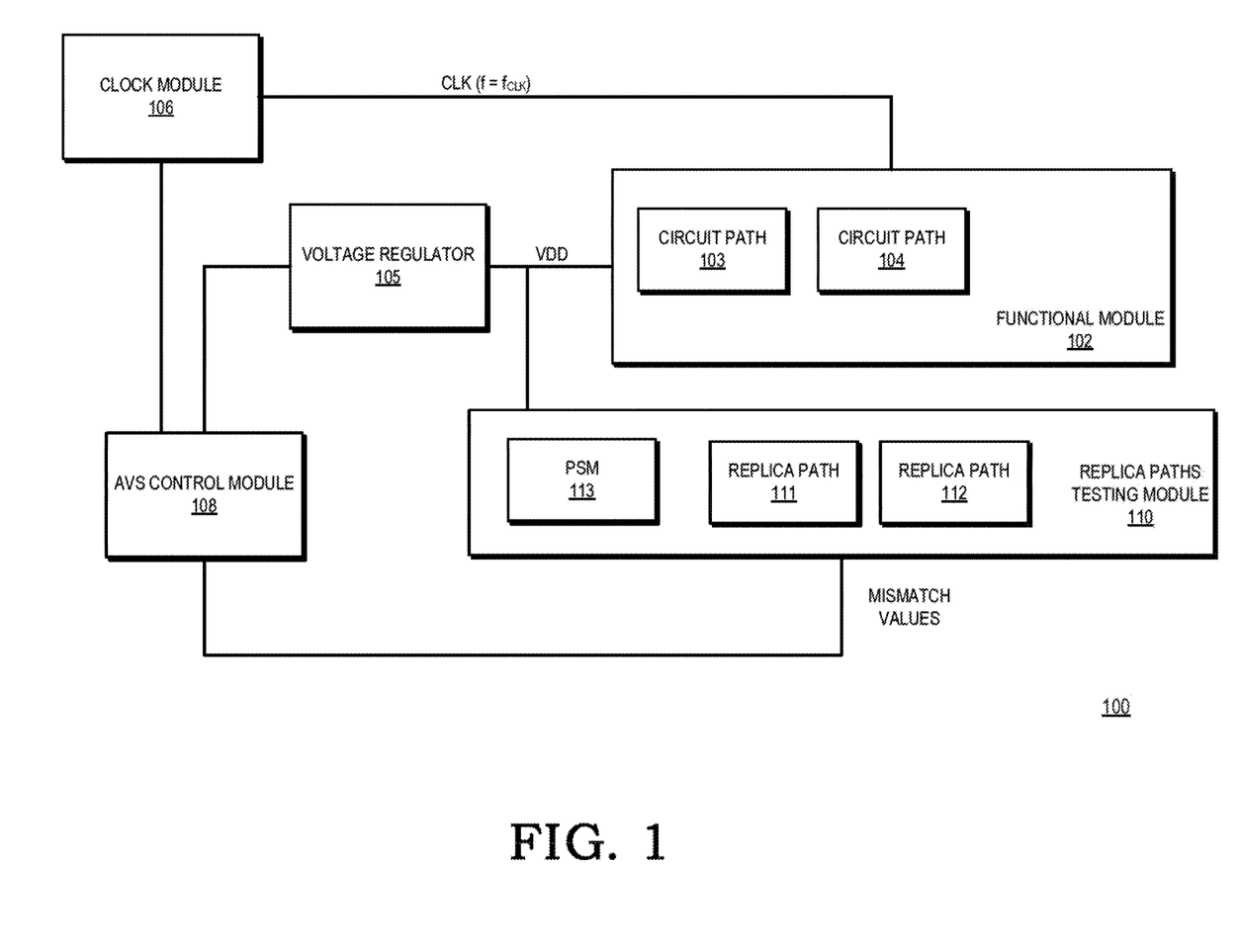
FIG. 1 is a block diagram of a processor in accordance with some embodiments.

FIG. 1 illustrates a block diagram of a processor 100 in accordance with some embodiments. The processor 100 can be a part of any of a number of electronic devices, such as a computer, server, game console, compute-enabled smartphone or other portable electronic device, and the like. The processor 100 is generally configured to execute sets of instructions, commonly referred to as programs, to carry out tasks on behalf of an electronic device. To facilitate performance of these tasks, the processor 100 includes a functional module 102. As used herein, the term functional module refers to a portion of a processor that is employed during normal, non-testing operation of the processor. Examples of functional modules include processor cores, such as one or more central processing units (CPUs), graphics processing units (GPUs), and accelerated processing units (APUs), memory controllers, interface and bridge devices such as northbridges and southbridges, input/output interfaces, and the like, or combinations or portions thereof. It will be appreciated that although a single functional module 102 is illustrated in the example of FIG. 1, in some embodiments the processor 100 includes multiple functional modules.

The functional module 102 includes a number of circuit paths, such as circuit paths 103 and 104 in the depicted example. Each of the circuit paths includes an input node to receive an input signal, a set of one or more logic devices (e.g., logic gates and synchronous devices such as latches) and an output node. Operations of the circuit paths are governed by at least two parameters: a clock signal (labeled "CLK" in the depicted example) and a supply voltage (labeled "VDD"). The CLK signal synchronizes the switching of states at synchronous devices (e.g. latches) of the circuit paths. The supply voltage VDD establishes one or more voltage rails for transistors of the circuit paths' logic devices. In order for each circuit path to operate correctly, the frequency of the CLK signal (designated "$f_{CLK}$") and the magnitude of VDD must be set so that changes in the input signals at each of the circuit paths have enough time to propagate through the respective path to the output node before the data at the output node is captured at a latch or other synchronous device. This amount of time for a particular path is referred to as the timing margin for the circuit path, and is dependent on the individual characteristics of the path, including the number of logic gates in the circuit path, the length of wire traces in the circuit path, and the like. Those circuit paths having the lowest timing margins require the most amount of time for propagation of signal changes are sometimes referred to as "critical paths." The critical paths thus govern the maximum $f_{CLK}$/VDD combinations that can be applied to the functional module 102 to ensure proper operation.

To regulate $f_{CLK}$ and VDD such that the timing margins for the critical paths are met, the processor 100 includes a voltage regulator 105, a clock module 106, and an adaptive voltage scaling (AVS) control module 108. The AVS control module 108 is generally configured to identify a maximum operating frequency and maximum operating voltage for the functional module 102 based on a set of constraints, including timing margins for a set of replica paths as described further below. In some embodiments, the set of constraints can include other constraints, such as a specified power envelope for the functional module 102. Based on the set of constraints, the AVS control module 108 sends control signaling to the voltage regulator 105 and the clock module 106. The voltage regulator 105 receives a voltage from a power supply (not shown) and, based on the received control signaling, regulates the received voltage to generate VDD, ensuring that VDD is below the maximum operating voltage. The clock module 106 generates the CLK signal based on the received control signaling to ensure that $f_{CLK}$ does not exceed the maximum operating voltage.

To determine at least a portion of the set of constraints for the AVS control module 108, the processor 100 includes a replica path testing module (RPTM) 110. The RPTM 110 includes a number of replica paths, such as replica paths 111 and 112 in the depicted example. Each of the replica paths includes an input node, an output node, and a set of logic gates disposed between the input node and the output node. Each of the replica paths includes a different set of logic gates, so that each replica path can represent and correlate to a different class of circuit path of functional module 102. In some embodiments, the replica paths of the RPTM 110 represent a selected subset of the circuit paths of the functional module 102, wherein the selected subset represents those circuit paths that have been identified as potentially critical paths during design of the processor 100.

As described further below, the RPTM 110 can apply an adjustable delay at the output nodes of each of the replica paths. At each replica path, the RPTM 110 can adjust the delay until there is a mismatch between the delayed output value and the value at the corresponding output node. The delay value that results in the mismatch (referred to for purposes of description as a mismatch value) indicates the timing margin for the corresponding replica path. The RPTM 110 provides a distribution of the mismatch values for the replica paths to the AVS control module 108, which uses the distribution to determine constraints on the maximum operating voltage and maximum operating frequency for the functional module 102. For example, in some embodiments the RPTM 110 provides the distribution as a set of "buckets" whereby each bucket represents a range of delay values and the value for a bucket indicates the number of replica paths having a mismatch value in the corresponding range. The AVS control module 108 determines an average and standard distribution deviation of the bucketed values, thereby assessing an average timing margin and standard deviation of the timing margins for the replica path testing module. The AVS control module 108 then sets the minimum operating voltage for a maximum operating frequency so that the average timing margin, within a specified number of standard deviations, is not exceeded. With a properly designed, normalized and masked set of replica paths, the distribution of path delays can accurately represent the distribution of the real critical paths in the processor consistent with sampling theory. Thus, in some embodiments the mean and standard deviation of delays of the replica paths can be used to calculate the mean and standard deviation of the delays of the real critical paths and thereby determine the maximum operating frequency of the processor at a given VDD value which is set by the slowest of the real critical paths in the processor.

Because the replica paths of the RPTM 110 represent circuit paths of the functional module 102, the mismatch values represent timing margins for the functional module 102 as well as for the replica paths. In some embodiments, process variations and operating condition variations at the processor 100 can cause the behavior, including timing behavior, of the replica paths to differ from that of their corresponding circuit paths. Accordingly, the RPTM 110 is configured to make adjustments at the replica paths, and in the distribution of mismatch values, to ameliorate the process and operating condition variations. For example, in some embodiments, each of the replica paths of the RPTM 110 includes a normalization delay element having an adjustable delay (referred to as an adjustable delay element). Prior to determining the mismatch values at the replica paths, the RPTM 110 tests the delay at each replica path, and adjusts the normalization delay element so that each replica path has the same delay between its input node and the output of the normalization delay element, within a specified tolerance. In some embodiments, the normalization is done at fixed conditions and only once for a given design with the goal being to maximize the correlation between the replica paths and the real paths. These normalization values are then fixed for the design and used by all the parts when they determine the frequency at a given voltage based on the RPTM. The normalization delay elements thereby calibrate the replica paths so that they more closely resemble the behavior of their corresponding circuit paths. In particular, a given replica path having a delay that varies greatly from the other replica paths indicates that the given replica path likely varies from its corresponding circuit path. Accordingly, by normalizing the delay of the given replica path, the RPTM 110 ensures that the given replica path more closely matches the timing of its corresponding circuit path.

In some scenarios, variations in VDD applied at one of the replica paths can cause variations in the mismatch value. To ameliorate such variations, the RPTM 110 includes one or more power supply monitors (PSMs), such as PSM 113 in the depicted example. The PSMs monitor variations in VDD as applied at the replica paths, and adjust the mismatch values based on the variations. For example, in some embodiments, the PSMs monitor VDD over time to determine an average value for VDD. If VDD, as applied to a given replica path, varies from the average VDD value by more than a threshold during a time when the mismatch value for the replica, path is being determined, the RPTM 110 can adjust the distribution of mismatch values based on the variation in VDD. In some embodiments, the RPTM 110 adjusts the distribution of mismatch values by placing the mismatch value for the replica path in a different value bucket than the delay value alone would mandate. The RPTM 110 thus ensures that temporary variations in VDD at the replica, paths does not cause an incorrect statistical distribution and an incorrect identification of the maximum operating frequency and maximum operating voltage at the AVS control module 108.

In some embodiments, selected ones of the replica paths at the RPTM 110 may not accurately reflect the behavior of the circuit paths of the functional module 102. Such scenarios can occur, for example, when the functional module is configured such that some of the circuit paths are not used. In such scenarios, the RPTM 110 can mask the distribution of mismatch values to omit the mismatch values for selected ones of the replica paths. This ensures that the distribution of mismatch values, and therefore the maximum operating frequency and voltage set by the AVS control module 108, accurately reflects the actual circuit paths that are in use at the functional module 102.

To illustrate via an example, in some embodiments the circuit paths of the functional module 102, and the corresponding replica paths of the RPTM 110, each can be classified into one of two types: wire-dominated paths and gate-dominated paths. The functional module 102 can be configured so that it primarily employs a circuit path of one of these types. In response to detecting such a configuration, the RPTM 110 can mask the distribution of mismatch values so that the resulting masked distribution of delay values omits the mismatch values from replica paths of the non-dominant type. For example, in response to detecting a configuration of the functional module 102 wherein wire-dominated circuit paths are the primary paths in use, the RPTM 110 can mask the distribution of mismatch values so that the distribution does not include mismatch values for gate-dominated replica paths. Therefore, the resulting statistical distribution of mismatch values provided to the AVS control module 108 will be based on wire-dominated replica paths, ensuring that the maximum operating voltage and frequency are set according to the paths that are in use at the functional module 102.

In some embodiments, the RPTM 110 can mask the distribution of mismatch values based on other criteria. For example, the RPTM 110 may determine that it cannot normalize the delay for one of the replica paths and, in response, mask the distribution of mismatch values so that the distribution does not include the mismatch value for the replica path. In some embodiments, the RPTM 110 may determine specific ones of the replica paths that represent circuit paths not in use at the functional module 102 because those circuit paths are permanently disabled (e.g., because the processor 100 has been placed in an electronic device where such circuit paths are never used). In response, the RPTM 110 can mask the distribution of mismatch values so that it does not include the mismatch values for those replica paths, thus ensuring that the distribution of mismatch values provided to the AVS control module 108 accurately reflect the circuit paths in use at the functional module 102.

Figure 2:
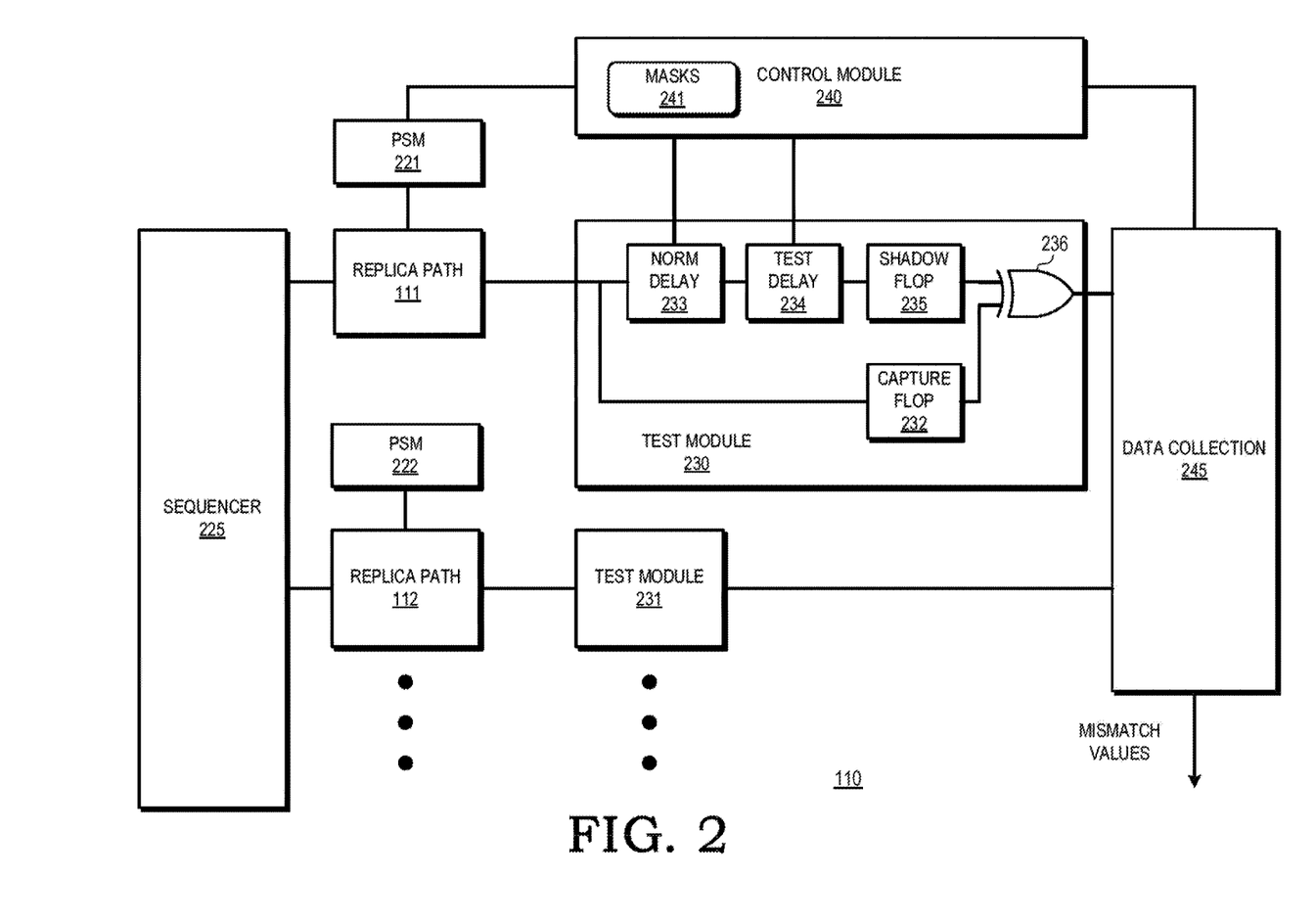
FIG. 2 is a block diagram of a replica path testing module of FIG. 1 in accordance with some embodiments.

FIG. 2 is a block diagram that illustrates additional details of the RPTM 110 in accordance with some embodiments. In the depicted example, the RPTM 110 includes a control module 240, a data collection module 245, a sequencer 225, replica paths (e.g., replica paths 111 and 112). PSMs (e.g., PSMs 221 and 222), and test modules (e.g., test modules 230 and 231). The control module 240 is generally configured to control operations at the RPTM 110, including initiating, and controlling determination of the mismatch values at the test modules as described further herein.

The test modules will be described with respect to the specific example of the test module 230, but it will be appreciated that the test module 231 and other test modules of the RPTM 110 are similarly configured. The test module 230 includes a capture flop 232 normalization delay module 233, a test delay module 234, a shadow flop 235, and an exclusive-or (XOR) gate 236. The normalization delay module 233 includes an input connected to the output node of the replica path 111 and an output. The test delay module 234 includes an input connected to the output of the normalization delay module 233 and an output. The shadow flop 235 includes an input connected to the output of the test delay module 234 and an output. The capture flop 232 includes an input connected to the output node of the replica path 111 and an output. The XOR gate 236 includes an input connected to the output of the shadow flop 235, an input connected to the output of the capture flop 232 and an output connected to the data collection module 245.

The XOR gate 236 asserts a signal at its output in response to a mismatch between the data captured at the capture flop 232 (i.e., the data at the output node of the replica path 111) and the data captured at the shadow flop 235 (the flops 232 and 235 are sometimes referred to as capture devices). The normalization delay module 233 and the test delay module 234 each applies a corresponding delay based to a signal at their input. The control module 240 adjusts these delays to 1) normalize the delays at the replica paths and 2) to identify the mismatch values at each replica path. To illustrate, the delays at the replica paths are normalized during a normalization phase. The normalization phase can take place after manufacture of the processor 100 but before it is provided to a customer or placed in an electronic device, can take place in response to a reset or other event at the processor 100, and the like. During the normalization phase, the control module 240 sets the test delay modules to apply a nominal delay (e.g. zero), and further sets specified VDD and $f_{CLK}$ values to apply to the test modules. Under these conditions, the control module 240 adjusts the delay applied at each normalization delay module of the test modules until each of the XOR gates asserts its output signal at the same time, within a specified tolerance. This ensures that the delay between the input nodes of the replica paths and the inputs of their respective test delay modules is the same, within a specified tolerance. In some embodiments, the specified tolerance is such that the delay for each combination of replica path and corresponding normalization delay would be placed in the same mismatch value bucket, as explained further below. By normalizing the delays for the replica paths, the control module 240 increases the number of the replica paths that will meaningfully contribute to the statistical distribution of mismatch values during a mismatch determination phase.

The mismatch determination phase takes place after the normalization phase, and can occur more frequently. During the mismatch determination phase, the normalization delays at the test modules are fixed at the values determined during the normalization phase. Further, during the mismatch determination phase, VDD and $f_{CLK}$ can be different from the values applied during the normalization phase. During the mismatch phase, the control module 240, beginning at a specified initial value (e.g., zero) incrementally increases the delay at each test delay module until the corresponding XOR gate asserts a signal at its output. The data collection module 245 identifies the delay at the test delay module that caused the assertion of the output signal and identifies a bucket that includes the delay. The data collection module 245 then increments a value for that bucket. The data collection module 245 thereby develops an initial distribution of mismatch values for the replica paths.

The sequencer 225 can be used during one or both of the normalization and mismatch determination phases to apply test signals at the input nodes of the replica paths. In some embodiments, the sequencer 225 sequences the application of the test signals so that different signal values are concurrently applied to input nodes of replica paths in close proximity to each other. This reduces the likelihood of cross-coupling or other signal interference issues between replica paths, thereby increasing the accuracy of the distribution of mismatch values.

In some embodiments, the control module 240 can adjust the initial distribution of mismatch values to account for process and operating condition variations and other factors. For example, to account for variations in VDD as applied to the replica paths, the PSMs of the RPTM 110 monitor VDD as applied to their respective replica path. For example, the PSM 221 of FIG. 1 monitors VDD as applied to the replica path 111. In some embodiments, the PSM 221 first determines an average value of VDD over a specified time. During the mismatch determination phase, the PSM 221 identifies whether VDD, as applied at the replica path 111, varies from the average VDD value by greater than a threshold amount, if so, the control module 240 adjusts the mismatch value for the replica path 111. In some embodiments, the control module 240 adjusts the mismatch value by changing, at the data collection module 245, the value bucket to which the mismatch value is assigned in the initial distribution of mismatch values. The control module 240 thereby ensures that temporary disturbances and variations in VDD do not cause improper mismatch value results.

The control module 240 stores masks 241, reflecting different configurations of the replica paths at the RPTM 110. Based on specified criteria, such as the configuration of the functional module 102, the control module 240 can select one of the masks 241 and apply the mask to the initial distribution of mismatch values to eliminate one or more of the replica paths from contributing to those values. To illustrate via an example, in some embodiments the replica path 111 is a wire-dominated path. In some scenarios, the control module 240 can determine that the functional module 102 is operating under a configuration wherein gate-dominated circuit paths are more likely to be critical paths. In response, the control module 240 selects one of the masks 241 corresponding to the wire-dominated replica paths, including the replica path 111. The control module 240 applies the mask to the initial distribution of mismatch values to eliminate the mismatch value for the replica path 111 (and any other wire-dominated replica paths) from the distribution. The control module 240 thereby ensures that the distribution of mismatch values more closely reflects the timing margins for the circuit paths of the functional module 102.

The control module 240 adjusts the initial distribution of mismatch values based on the PSMs and by applying one or more of the masks 241, thereby generating an adjusted distribution of mismatch values. The data collection module 245 provides the adjusted distribution of mismatch values to the AVS control module 108 (FIG. 1), which uses the distribution to identify the maximum operating frequency and maximum operating voltage for the functional module 102.

Figure 3:
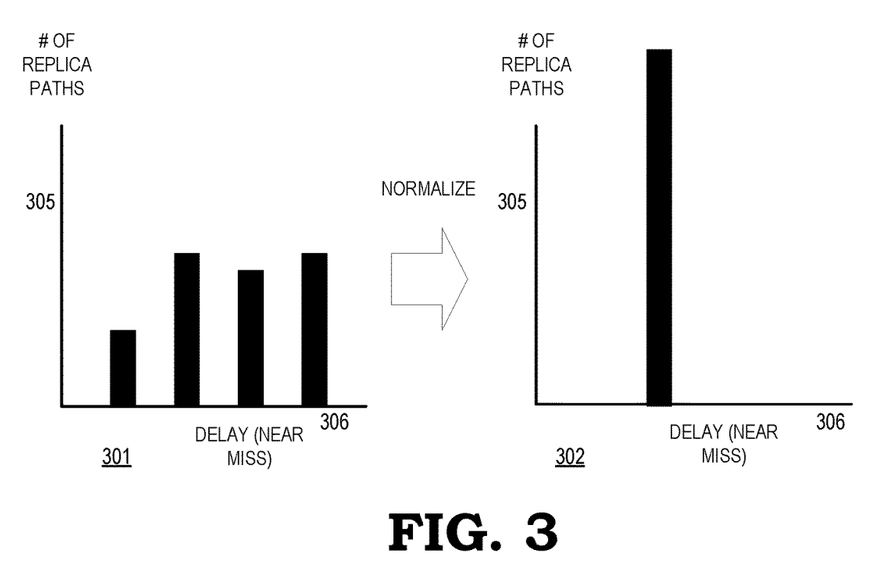
FIG. 3 is a diagram illustrating normalization of delays at replica paths of FIG. 2 in accordance with some embodiments.

FIG. 3 is a diagram illustrating normalization of delays at replica paths of the RPTM 110 in accordance with some embodiments. FIG. 3 illustrates a histogram 301 representing a distribution of delays at the replica paths. The histogram 301 includes a y-axis 305 representing the number of replica paths and an x-axis 306 representing delay. The histogram 301 further includes a number of rectangles, such as rectangles 310 and 315, wherein each rectangle corresponds to a delay value bucket. The width of a rectangle along the x-axis 306 corresponds to the range of delay values for the bucket and the height of the rectangle along the y-axis 305 represents the number of replica path delays (including their corresponding test modules) having a delay in the rectangle's delay range.

Prior to normalization, the distribution of the replica path delays of the RPTM 110 is indicated by the histogram 301. During the normalization phase, the control module 240 adjusts the delay provided by each of the normalization delay modules so that the replica path delays all fall within a particular bucket (bucket 315 in the depicted example). Thus, after normalization, the distribution of the replica path delays is represented by the histogram 302, wherein all of the replica path delays fall within the bucket 315. This ensures that, during the mismatch determination phase, all of the replica paths will contribute to the distribution of mismatch values, thereby increasing the likelihood that the distribution of mismatch values represents the timing margins of circuit paths at the functional module 102.

Figure 4:
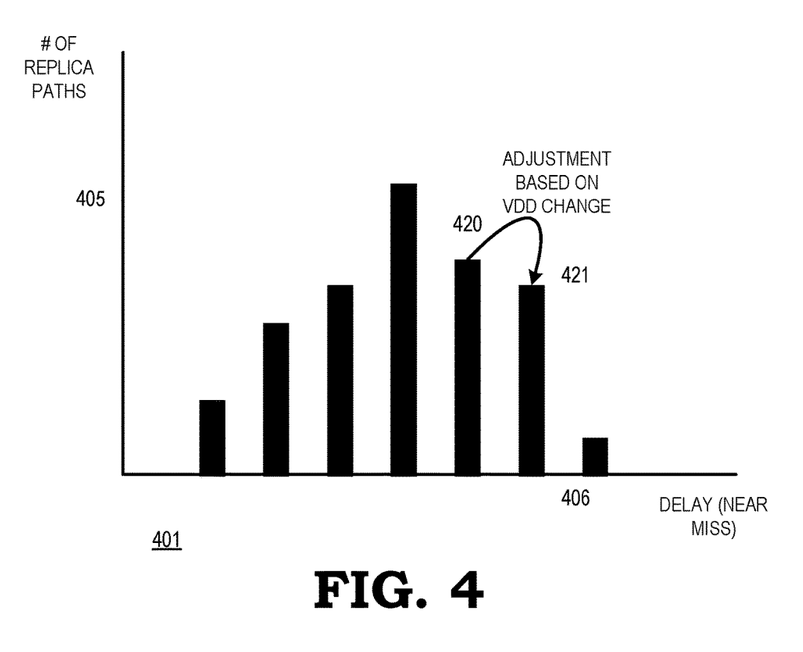
FIG. 4 is a diagram illustrating example test results at the replica path testing module of FIG. 2 in accordance with some embodiments.

FIG. 4 illustrates a histogram 401 of a distribution of mismatch values in accordance with some embodiments. The histogram 401 is depicted in similar fashion to the histogram 301 of FIG. 1, in that it includes a y-axis 405 representing a number of replica paths, an x-axis 406 representing delay values, and a number of rectangles each corresponding to a different bucket. In the example of FIG. 4, each bucket of the histogram 401 represents the number of replica paths at the RPTM 110 having a test delay value in the delay value range that, during the mismatch determination phase, caused a mismatch between the data at the corresponding capture flop and shadow flop. To illustrate, during the mismatch phase, at each test delay module the control module 240 incrementally adjusts the delay until a mismatch between the data at the corresponding capture flop and the corresponding shadow flop is indicated by the XOR gate. In response to the mismatch, the control module 240 identifies the delay that caused the mismatch, identifies the bucket of the histogram 401 that includes the identified delay, and increments the number of replica paths for that bucket. After the control module 240 has identified delays for all of the replica paths, the histogram 401 represents the distribution of mismatch values for the replica paths.

After the distribution of mismatch values has been identified, the control module 240 can adjust the histogram 401 based on operating conditions at the replica paths. For example, if a PSM at the RPTM 110 identifies a variation in the VDD applied to a given replica path, the control module 240 can change the bucket associated with that replica path. In the illustrated example, the control module 240 has identified a VDD variation for a replica path having a mismatch value corresponding to bucket 420. In response, the control module 240 decrements the number of replica paths for bucket 420 and increments the number of replica paths for bucket 421. These adjustments reflect an assumption that, in the absence of the variation in VDD, the mismatch value for the replica path would have fallen with bucket 421, rather than bucket 420. Thus, the control module 240 can adjust the mismatch values so that the distribution of mismatch values, as represented by the histogram 401, is more likely to represent the timing margins for the circuit paths of the functional module 102.

Figure 5:
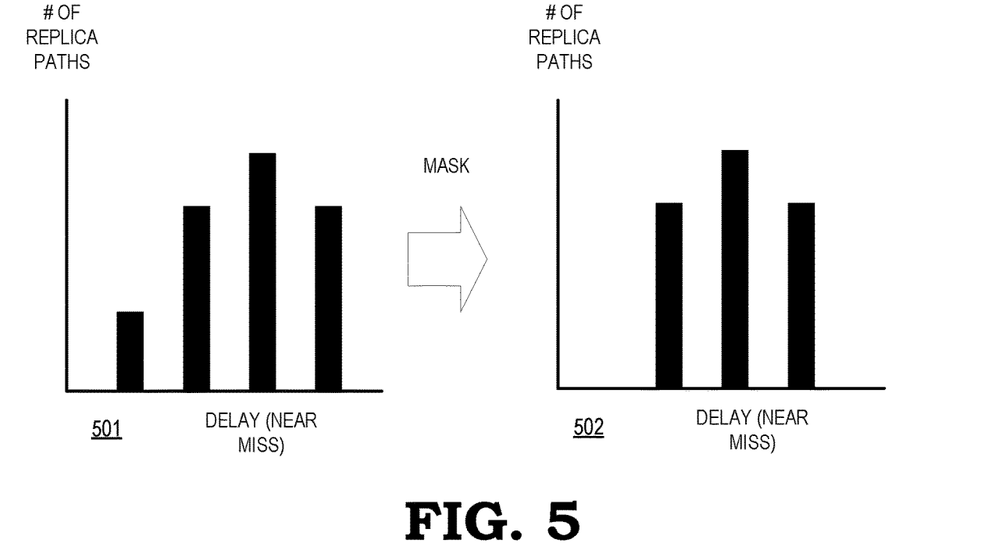
FIG. 5 is a diagram illustrating masking of replica paths at the replica path testing module of FIG. 2 in accordance with some embodiments.

FIG. 5 illustrates masking of the distribution of mismatch values in accordance with some embodiments. FIG. 5 illustrates a histogram 501, representing an initial distribution of mismatch values as identified during a mismatch determination phase of the RPTM 110. Based on one or more specified conditions, such as a configuration of the functional module 102, a type of circuit path, and the like, the control module 240 selects one of the masks 241 that identifies selected ones of the replica paths of the RPTM 110. The RPTM 110 applies the mask to the initial distribution of mismatch values, thereby eliminating the selected ones of the replica paths from the distribution. The resulting distribution of mismatch values is represented by histogram 502.

Figure 6:
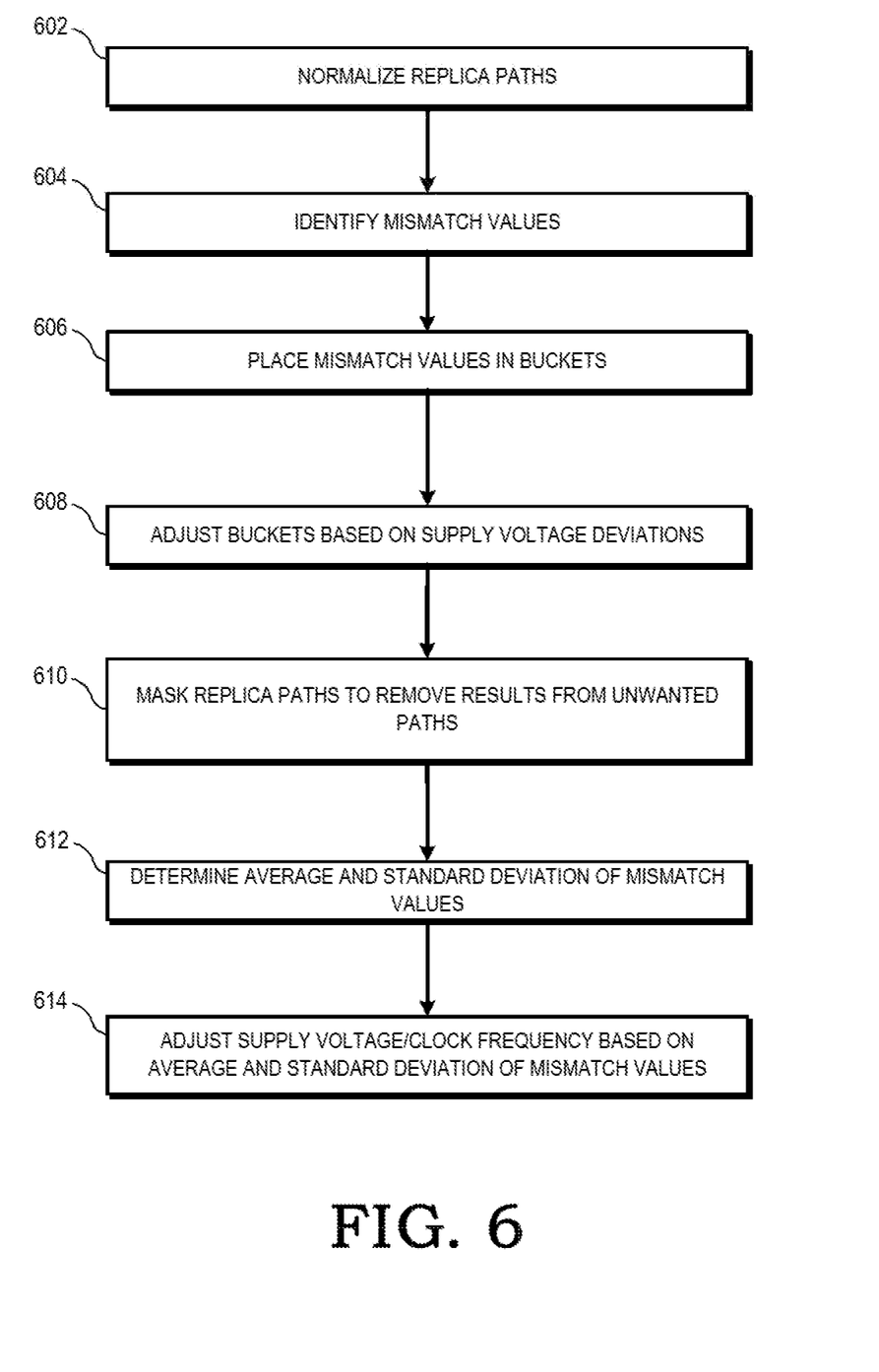
FIG. 6 is a flow diagram illustrating a method of adjusting a clock frequency or a supply voltage of a processor based on replica path testing in accordance with some embodiments.

FIG. 6 illustrates a flow diagram of a method of adjusting one or both of a supply voltage (e.g., VDD) and clock frequency (e.g. $f_{CLK}$) at the processor 100 in accordance with some embodiments. At block 602, during a normalization phase the RPTM 110 normalizes the replica path delays at the replica paths and corresponding test modules. At block 604, during mismatch determination phase, the control module 240 identifies, for each replica path, a corresponding mismatch value. The mismatch values correspond to timing margin assessments for capture devices at the replica paths. At block 606, the control module 240 places the mismatch values into buckets to determine an initial distribution of mismatch values for the replica paths. At block 608, the control module 240 adjusts the buckets of the initial distribution based on variations in the supply voltage as applied at each of the replica paths. At block 610, the control module 240 uses one of the masks 241 to remove any unwanted replica paths from the distribution of mismatch values as adjusted at block 608. The data collection module 245 provides the resulting distribution of mismatch values to the AVS control module 108. At block 612, the AVS control module 108 determines the average and standard deviation of the mismatch values and, at block 614 adjusts one or both of VDD and $f_{CLK}$ based on these values. For example, the AVS control module 108 can adjust VDD to ensure that a maximum operating voltage and frequency for the functional module 102, as indicated by the average and standard deviation values, is not exceeded.

In some embodiments, the apparatus and techniques described above are implemented in a system comprising one or more integrated circuit (IC) devices (also referred to as integrated circuit packages or microchips), such as the processor described above with reference to FIGS. 1-5. Electronic design automation (EDA) and computer aided design (CAD) software tools may be used in the design and fabrication of these IC devices. These design tools typically are represented as one of more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media e.g., compact disc (CD), digital versatile disc (DVD). Blu-Ray disc), magnetic media e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 7:
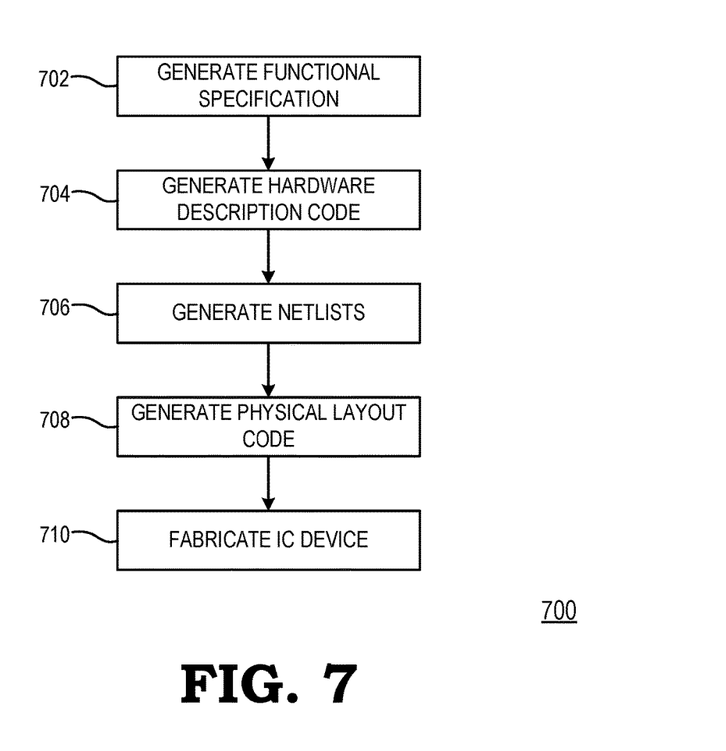
FIG. 7 is a flow diagram illustrating a method for designing and fabricating an integrated circuit device implementing at least a portion of a component of a processing system in accordance with some embodiments.

FIG. 7 is a flow diagram illustrating an example method 700 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 702 a functional specification for the IC device is generated. The functional specification (often referred to as a micro architecture specification (MAS)) may be represented by any of a variety of programming languages or modeling languages, including C, C++, SystemC, Simulink, or MATLAB.

At block 704, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 706 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 708, one or more EDA tools use the netlists produced at block 706 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 710, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, of elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any of all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   at a plurality of replica paths of an electronic device coupled to a first plurality of delay elements, adjusting delays of the delay elements at a control module to identify a distribution of delay values that result in timing margin assessments at capture devices of the plurality of replica paths, each of the plurality of replica paths correlating to a class of circuit path of a functional module of the electronic device;

adjusting the distribution of delay values at a control module based on changes in a set of reference voltages supplied to the plurality of replica paths; and configuring at an adaptive voltage scaling module, and based on the adjusted distribution of delay values, at least one of a voltage supplied to the functional module and a clock frequency of a clock signal supplied to the functional module.

2. The method of claim 1, wherein:

identifying the distribution of delay values comprises generating a first delay value at a first replica path of the plurality of replica paths; and adjusting the distribution of delay values comprises:
monitoring a first voltage of the set of reference voltages supplied to the first replica path; and
adjusting the first delay value based on a difference between an average value of the first voltage and a value of the first voltage when the first delay value was generated.

3. The method of claim 1, further comprising:

adjusting a second plurality of delay elements of the plurality of replica paths to normalize delays for the plurality of replica paths.

4. The method of claim 1, wherein adjusting the distribution of delay values further comprises masking the distribution of delay values.

5. The method of claim 4, wherein masking the distribution of delay values comprises masking the delay values based on a type of replica path.

6. The method of claim 5, wherein the type of replica path is selected from the group consisting of a gate-dominated path and a wire dominated path.

7. The method of claim 4, wherein masking the distribution of delay values comprises masking the second plurality of delay values based on a configuration of the functional module.

8. A method comprising:

at a plurality of replica paths of an electronic device adjusting at a control module a first plurality of delay elements to normalize delays of the plurality of replica paths so that delays of the first plurality of delay elements fall within a first range, each of the plurality of replica paths representing a corresponding circuit path of a functional module of the electronic device;

after normalizing the plurality of replica paths, adjusting at a control module a second plurality of delay elements to identify a distribution of delay values that result in mismatches at capture devices of the plurality of replica paths; and configuring at an adaptive voltage scaling module, based on the distribution of delay values, at least one of a voltage supplied to the functional module and a clock frequency of a clock signal supplied to the functional module.

9. The method of claim 8, further comprising:

adjusting the distribution of delay values in response to a variation in a reference voltage supplied to one of the replica paths; and wherein adjusting the at least of the voltage supplied to the functional module and the clock frequency comprises adjusting based on the adjusted distribution of delay values.

10. The method of claim 8, further comprising:

masking the distribution of delay values; and wherein adjusting the at least of the voltage supplied to the functional module and the clock frequency comprises adjusting based on the masked distribution of delay values.

11. The method of claim 10, wherein masking the distribution of delay values comprises masking the distribution of delay values based on a type of replica path.

12. The method of claim 11, wherein the type of replica path comprises a gate-dominated path.

13. The method of claim 11, wherein the type of replica path comprises a wire-dominated path.

14. A processor comprising:

a functional module comprising a plurality of circuit paths:

a plurality of replica paths representing at least a portion of the plurality of circuit paths;

a plurality of test modules coupled to corresponding outputs of the plurality of replica paths, each of the plurality of test modules comprising a first adjustable delay element, a first capture device, and a second capture device;

a control module to:
adjust the first adjustable delay elements to identify a distribution of delay values that result in mismatches at the first and second capture devices;
adjust the distribution of delay values based on changes in a set of reference voltages supplied to the plurality of replica paths; and an adaptive voltage scaling module to configure, based on the adjusted distribution of delay values, at least one of a voltage supplied to the functional module and a clock frequency of a clock signal supplied to the functional module.

15. The processor of claim 14, further comprising:

a power supply monitor to monitor a one voltage of the set of reference voltages supplied to one of the plurality of replica paths; and wherein the control module is to adjust the distribution of delay values based on a difference between an average value of one voltage and a value of the one voltage when the distribution of delay values was generated.

16. The processor of claim 14, wherein:

each of the plurality of test modules further comprises a second adjustable delay element; and:

the control module is to adjust the second adjustable delay elements to normalize delays of the plurality of replica paths.

17. The processor of claim 14, wherein the control module is to adjust the distribution of delay values by masking the distribution of delay values.

18. The processor of claim 17, wherein the control module is to mask the distribution of delay values based on a type of replica path.

19. The processor of claim 18, wherein the type of replica path is selected from the group consisting of a gate-dominated path and a wire dominated path.

20. The processor of claim 17, wherein the control module is to mask the distribution of delay values based on a configuration of the functional module.

* * * * *

UNITED STATES PATENT AND TRADEMARK OFFICE
CERTIFICATE OF CORRECTION

PATENT NO. : 9,575,553 B2
APPLICATION NO. : 14/576924
DATED : February 21, 2017
INVENTOR(S) : Toh et al.

Page 1 of 1

It is certified that error appears in the above-identified patent and that said Letters Patent is hereby corrected as shown below:

In the Claims

Column 13, Line 32, Claim 6 change "path and a wire dominated path." to --path and a wire-dominated path.--

Column 13, Line 59, Claim 9 change "wherein adjusting the at least of the voltage supplied to" to --wherein configuring the at least one of the voltage supplied to--

Column 14, Line 3, Claim 10 change "wherein adjusting the at least of the voltage supplied to" to --wherein configuring the at least one of the voltage supplied to--

Column 14, Line 16, Claim 14 change "paths:" to --paths;--

Column 14, Line 58, Claim 19 change "nated path and a wire dominated path." to --nated path and a wire-dominated path.--

Signed and Sealed this
Twenty-seventh Day of March, 2018

Andrei Iancu
*Director of the United States Patent and Trademark Office*